COIN DISPENSING MACHINE
Filed Dec. 27, 1960 8 Sheets-Sheet 1
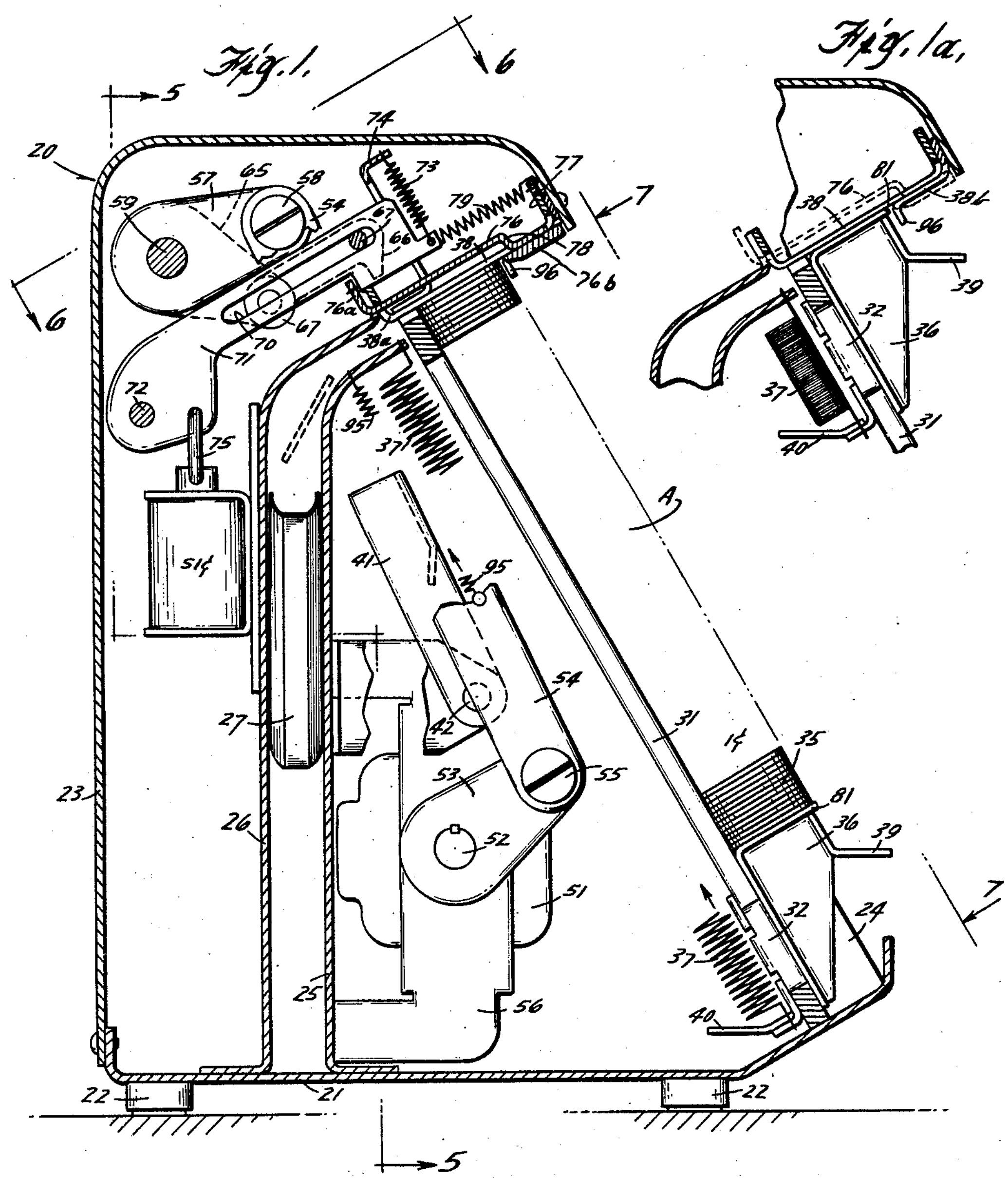
INVENTORS.
ARNOLD R. BUCHHOLZ
GEORGE V. JOHNSON
BY
Arnold J. Ericsen
ATTORNEY COIN DISPENSING MACHINE
Filed Dec. 27, 1960
8 Sheets-Sheet 2
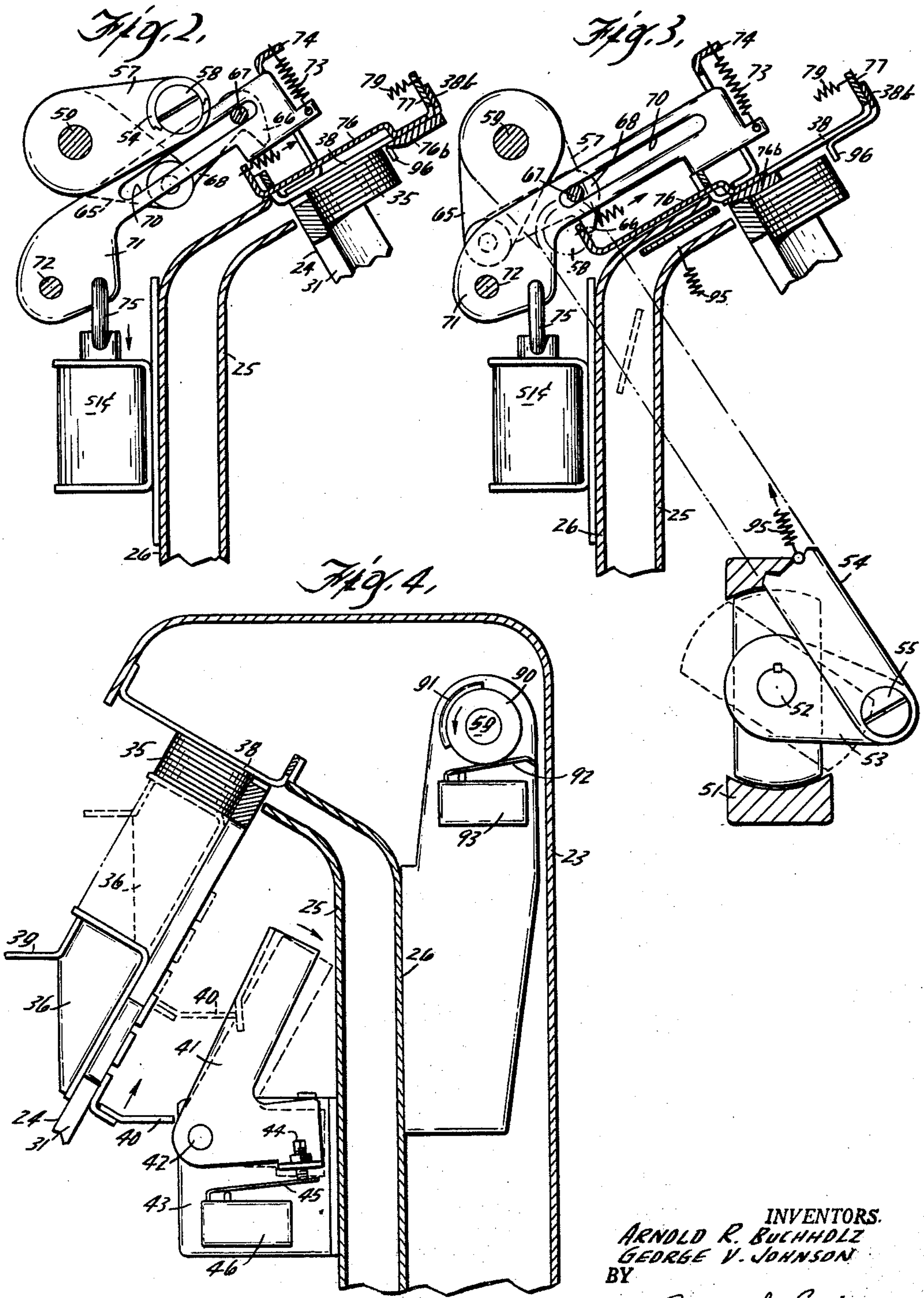
INVENTORS.
ARNOLD R. BUCHHOLZ
GEORGE V. JOHNSON
BY
Arnold J. Ericsen
ATTORNEY COIN DISPENSING MACHINE
Filed Dec. 27, 1960
8 Sheets-Sheet 3
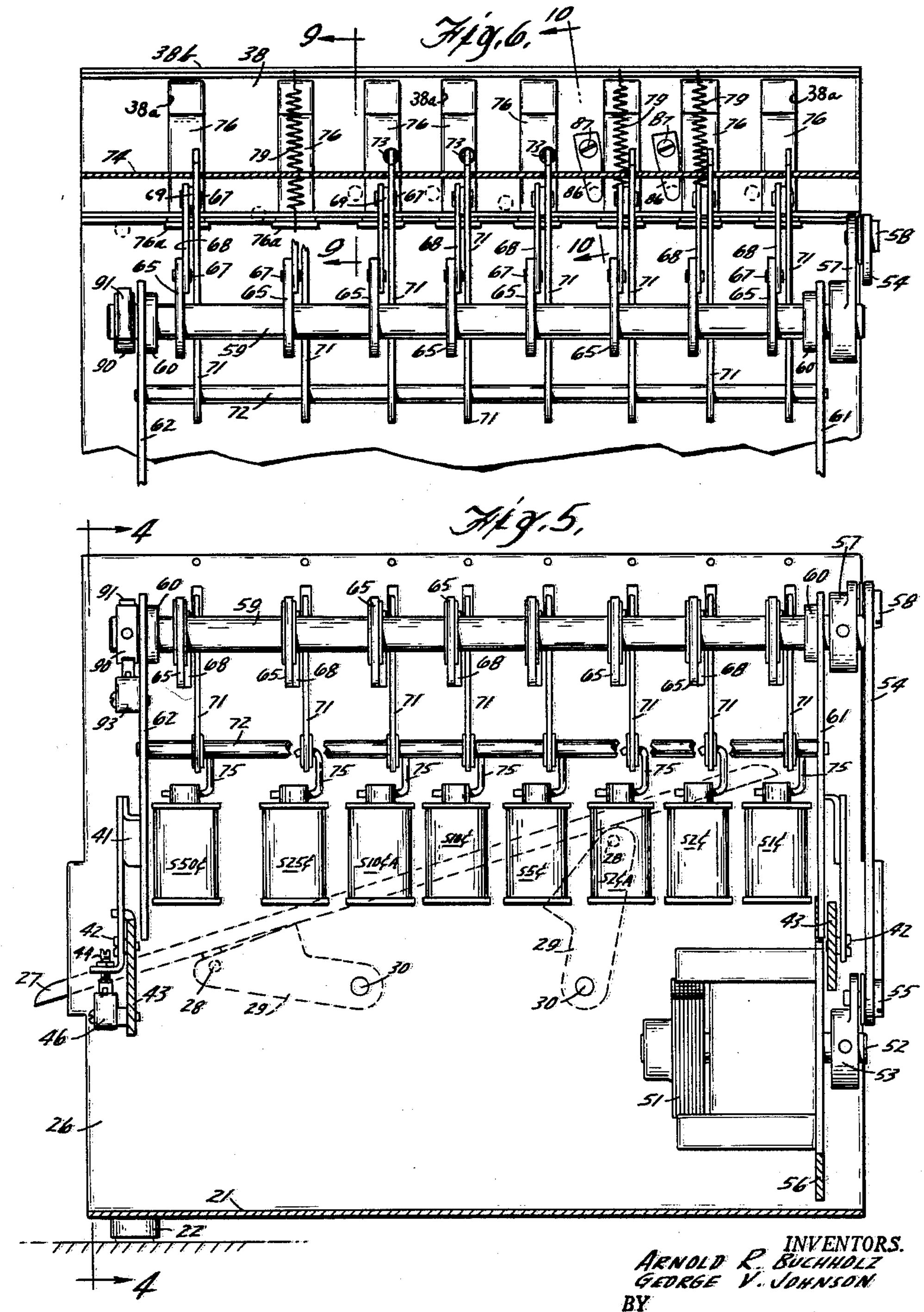
INVENTORS.
ARNOLD R. BUCHHOLZ
GEORGE V. JOHNSON
BY
Arnold J. Ericsen
ATTORNEY Fig. 7.
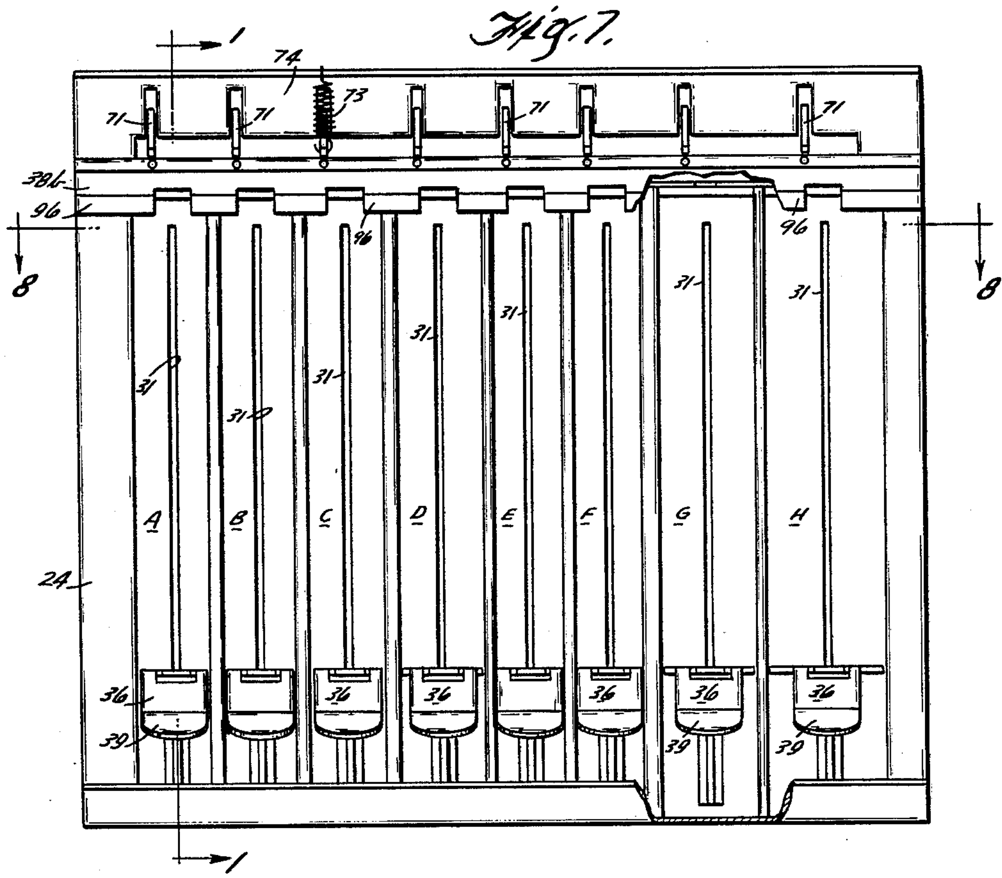
Fig. 8.
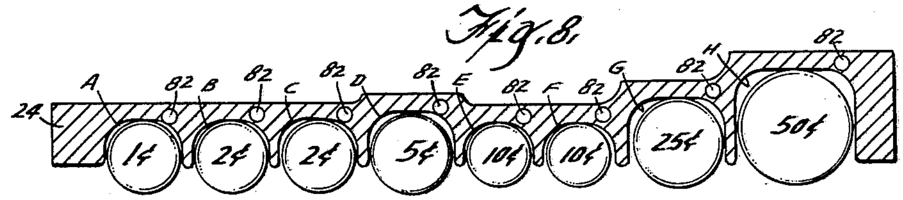
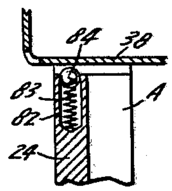
Fig. 9.
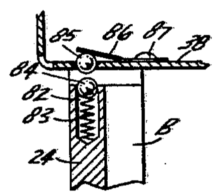
Fig. 10.
INVENTORS.
ARNOLD R. BUCHHOLZ
GEORGE V. JOHNSON
BY
Arnold J. Ericsen
ATTORNEY

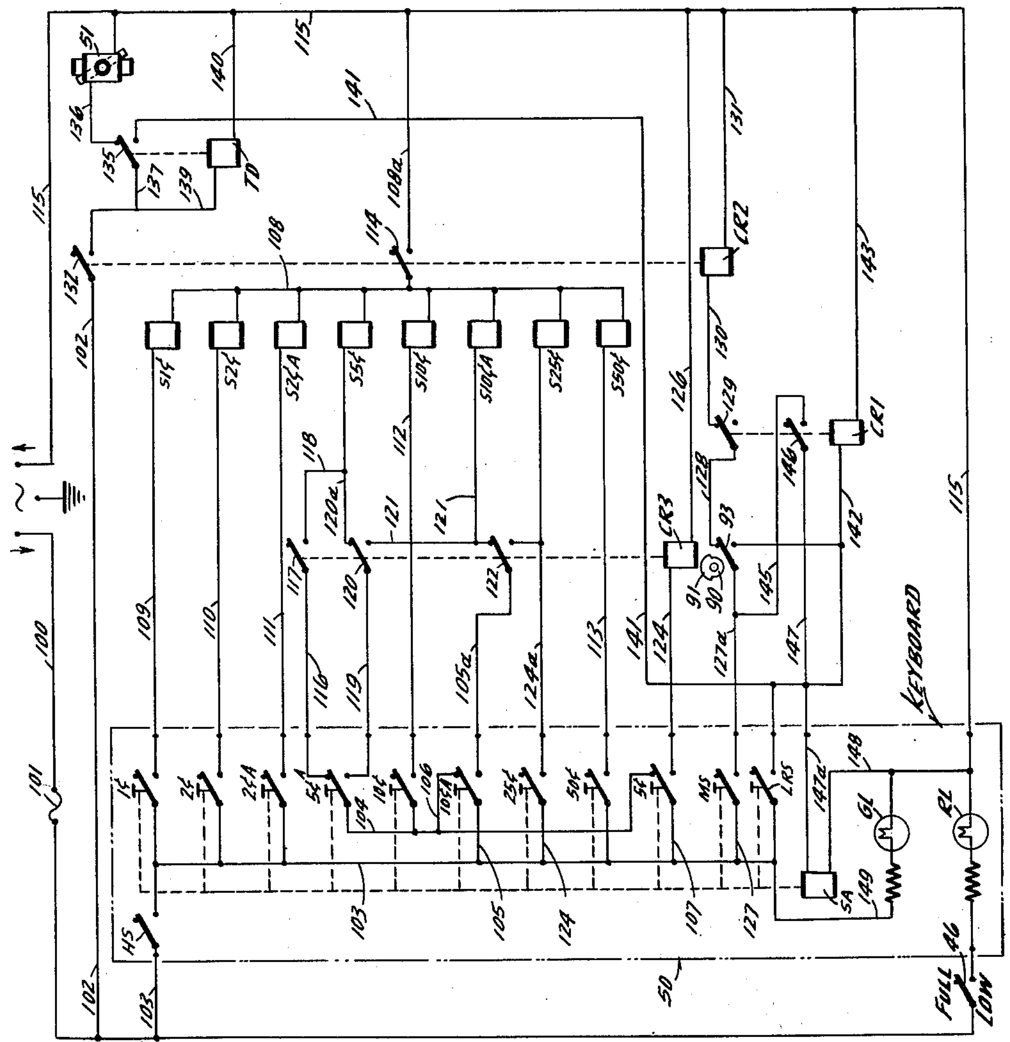
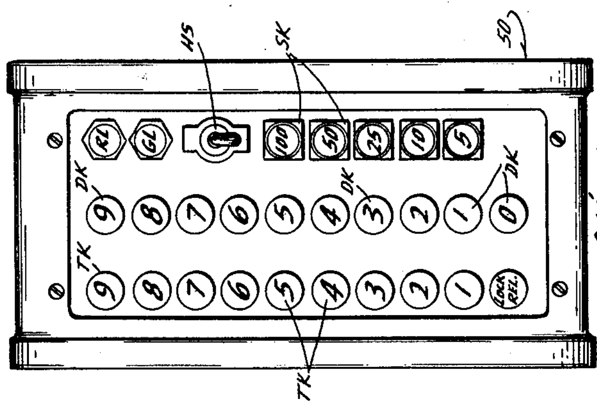
INVENTOR.
ARNOLD R. BUCHHOLZ
GEORGE V. JOHNSON
BY
Arnold J. Ericsen
ATTORNEY COIN DISPENSING MACHINE
Filed Dec. 27, 1960 8 Sheets-Sheet 6
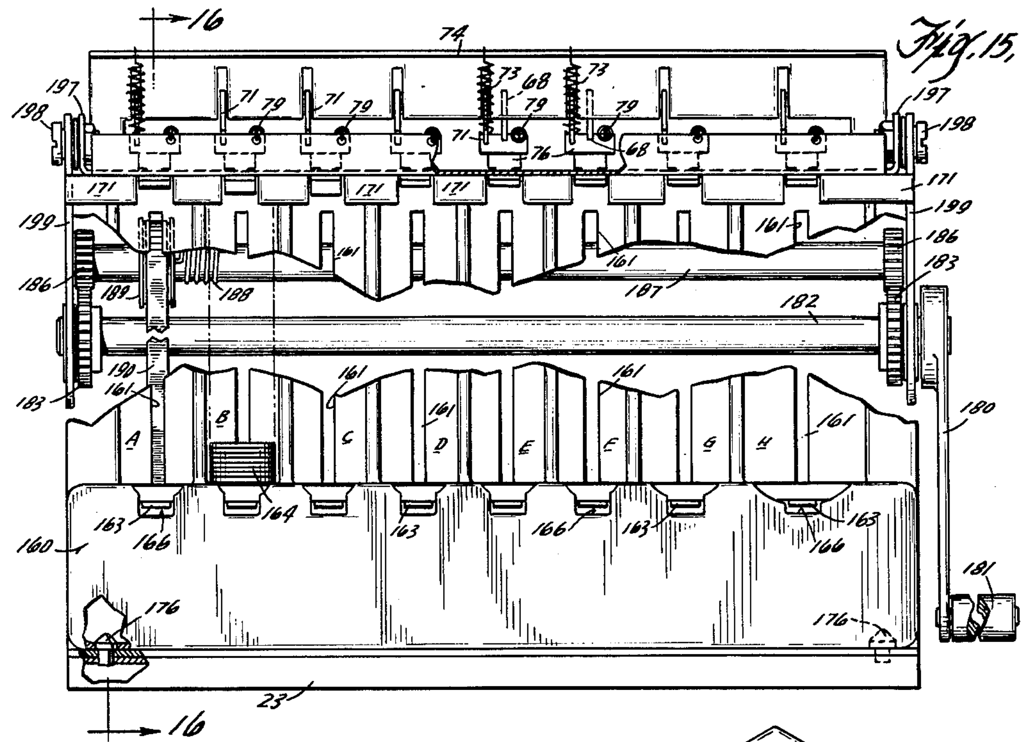
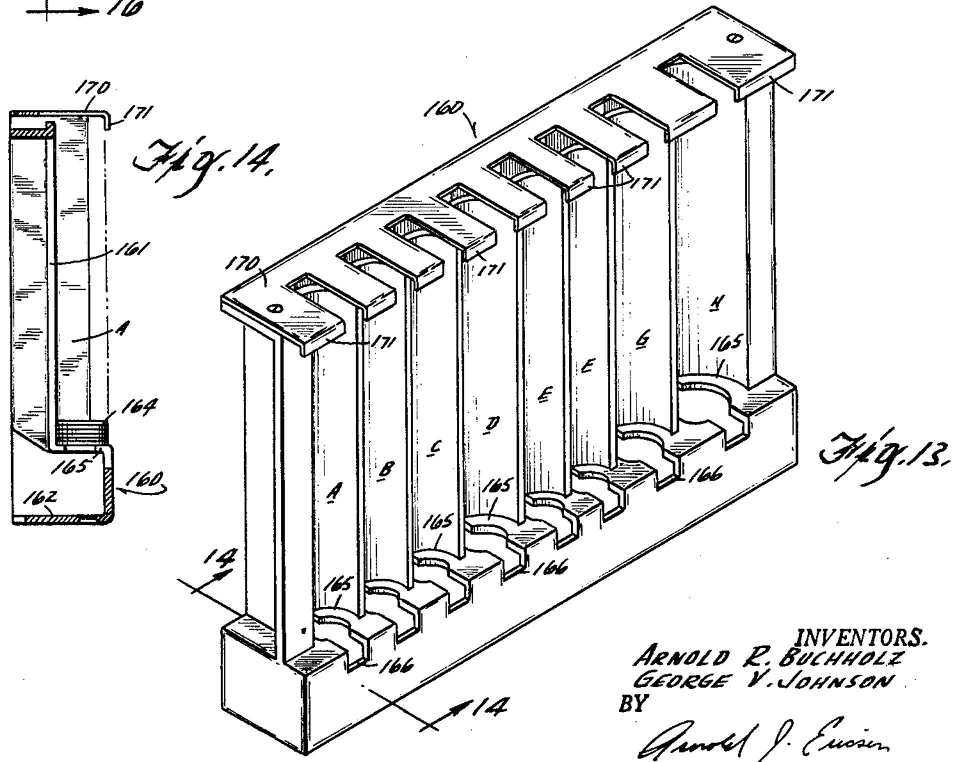
INVENTORS.
ARNOLD R. BUCHHOLZ
GEORGE V. JOHNSON
BY
Arnold J. Ericsen
ATTORNEY COIN DISPENSING MACHINE
Filed Dec. 27, 1960 8 Sheets-Sheet 7
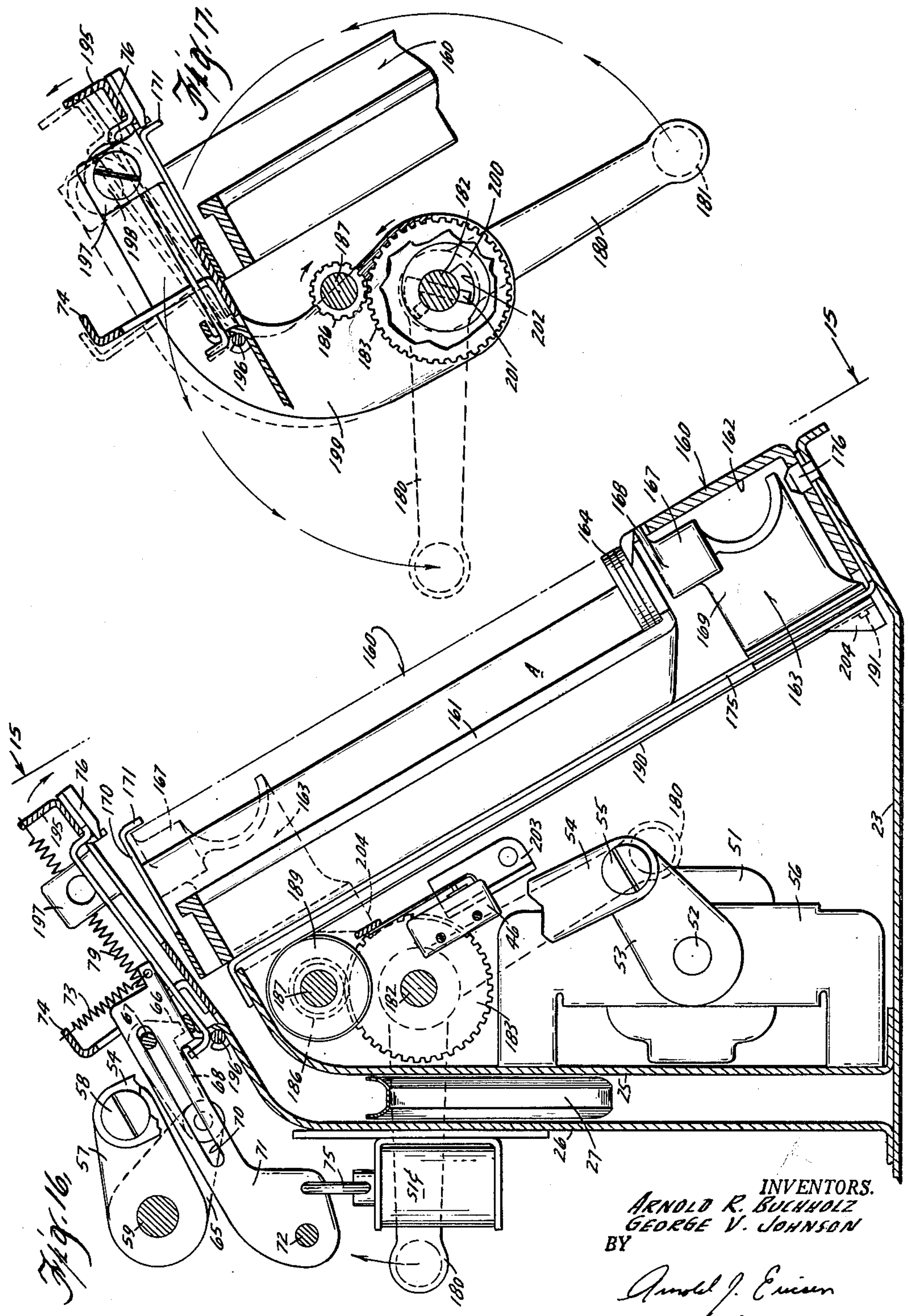

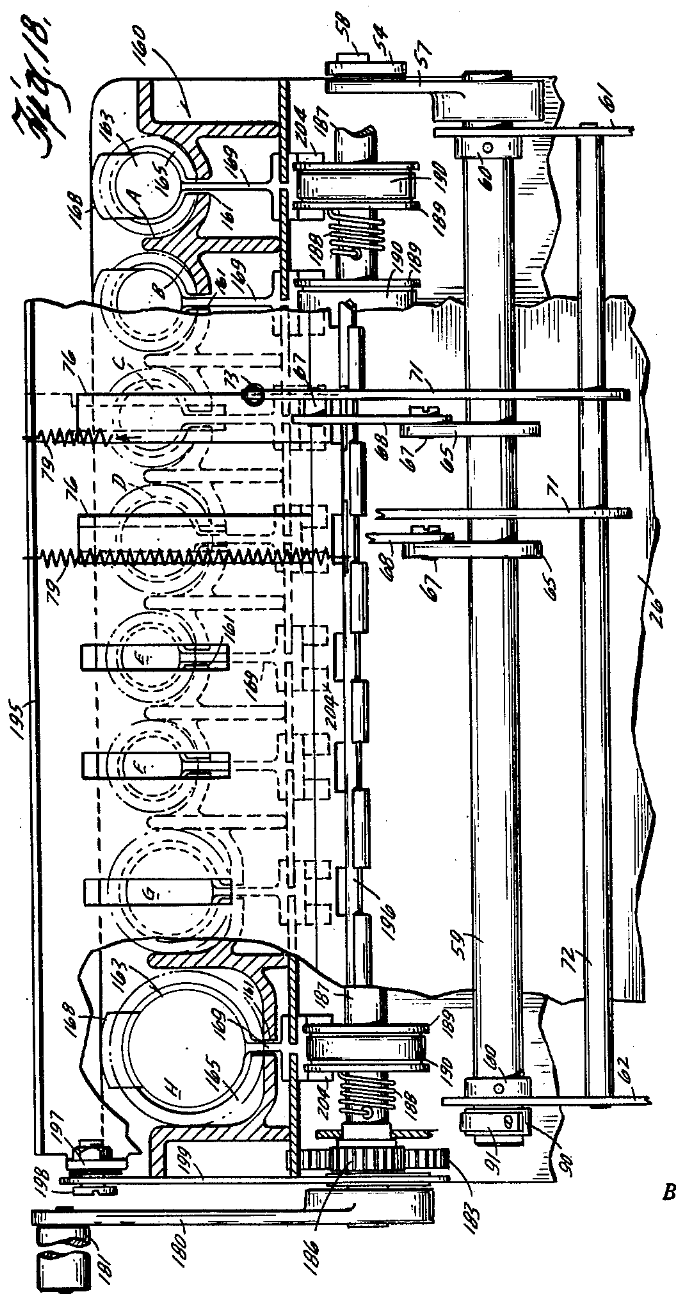
INVENTORS.
ARNOLD R. BUCHHOLZ
GEORGE V. JOHNSON
BY
Arnold J. Ericsen
ATTORNEY United States Patent Office 3,131,702
Patented May 5, 1964

1

3,131,702
COIN DISPENSING MACHINE

Arnold R. Buchholz and George V. Johnson, Watertown, Wis., assignors to Brandt Automatic Cashier Company, Watertown, Wis., a corporation of Wisconsin Filed Dec. 27, 1960, Ser. No. 78,381
12 Claims. (Cl. 133—4)

The present invention relates to coin dispensing machines, and particularly to an improved dispenser unit suitable for use in either changer or payer installations, and herein described in connection with a simplified and improved circuit for a coin payer installation.

Among the objects of the present invention is the provision of a coin dispenser of reduced height, which reduction in no manner affects the usual coin capacity for dispensers, and in which the coins disposed in the various channels of the dispenser are delivered from the top of the coin stack to provide a simplified construction; further wherein the coin depletion channel lock operates independently of the coins and in no way interferes with their movement; and still further wherein the prime mover for operating the dispenser acts upon only those coin ejecting fingers which have been selected rather than upon all of the fingers whether selected or not, as in prior electrically operated constructions. In addition, there is no requirement for shifting of preselected levers to an operating position, but merely a direct contact with the particular selector for pushing the coin laterally, outwardly from the selected channels.

Another object of the present invention is to provide a dispenser including a coin depletion lock that is selective to lock only that one or more channels which have been depleted and to further permit operation of this dispenser for dispensing amounts which would not involve the said depleted channels; as, for instance, where the dispenser receives a signal to dispense a quarter and one of the penny channels has been depleted, the quarter will be dispensed.

It is a further object of the present invention to provide a dispensing unit for dispensing coins in either a coin paying or coin changing application, wherein the dispenser components act to remove the uppermost coins from the receiving channels to provide a positive operation with a minimum number of parts and simplified construction.

It is still another object of the present invention to provide a coin dispenser unit which may take the form of having either a fixed coin tray or a removable coin tray in which the latter tray may be inserted or removed at the convenience of the operator without interfering with any of the other operating parts of the dispenser.

It is still a further object of the present invention to provide a coin dispensing unit which may be utilized directly with a keyboard, any keyboard having 10, 19 or 99 keys, if desired, to provide the selected coin dispensing signal.

Still another object of the present invention is to provide a coin dispensing unit which may be readily adapted for use with keyboards having special keys for providing split-change upon the depression of a single key.

A still further object of this invention resides in a simplified electric circuit arrangement for dispensing coins during a coin paying operation.

The invention further consists in the several features hereinafter set forth and more particularly defined by the claims at the conclusion hereof.

In the drawings:

FIG. 1 is a side elevational view of the dispenser unit in cross section taken through the one cent coin channel, and further illustrating an embodiment of the dispenser having a fixed coin tray included therewith;

FIG. 1*a* is a fragmentary view of the upper portion of

2 the dispenser illustrating the respective parts in locked position following a coin depletion of a particular channel involved;

FIGS. 2 and 3 are fragmentary sectional views taken in the plane of FIG. 1 illustrating the operation of the mechanism for dispensing coins upon the operation of the prime mover;

FIG. 4 is a fragmentary sectional view of the dispenser taken from the opposite side of the view of FIG. 1 and taken along lines 4—4 of FIG. 5, and more particularly illustrating the arrangement for indicating near coin depletion in one or more of the coin channels and the means for restoring key operated switches to their respective normal operating positions;

FIG. 5 is a vertical sectional view taken along the line 5—5 of FIG. 1 and illustrating the components disposed at the rear of the machine, but with operating relays and terminal blocks removed for purposes of illustration. The outer, protective casing has also been removed;

FIG. 6 is a fragmentary plan view taken along line 6—6 of FIG. 1 and with the outer casing of the dispenser having been removed;

FIG. 7 is a front view of the dispenser taken in the plane of lines 7—7 of FIG. 1;

FIG. 8 is a cross sectional view taken along lines 8—8 of FIG. 7 illustrating the various coin retaining channels of the coin tray portion of the present dispenser embodiment;

FIGS. 9 and 10 are fragmentary sectional views taken along lines 9—9 and 10—10, respectively, of FIG. 6 to more particularly illustrate the coin retaining and gating means;

FIG. 11 is a top plan view of a nineteen key keyboard readily adapted for remote-control use with the dispenser;

FIG. 12 is a schematic wiring diagram of the electrical circuit supplying both the dispenser unit and the keyboard, the outline of the keyboard being indicated by means of dash-dot lines thereon;

FIGS. 13–18 relate to another embodiment of the dispenser in which the coin tray is removable and wherein:

FIG. 13 is a perspective view of the removable coin tray;

FIG. 14 is a vertical section taken along lines 14—14 of FIG. 13 and through one of the coin channels thereof;

FIG. 15 is a front elevational view of the dispenser of the present embodiment including parts broken away to illustrate the interior operating components thereof;

FIG. 16 is a cross sectional side elevation similar to FIG. 1, but taken along line 16—16 of FIG. 15, and illustrative of operating components for dispensing one cent coins;

FIG. 17 is a fragmentary view, partially in section, illustrating in detail a means for latching and unlatching the removable tray from the dispenser unit and for setting coin elevators in operating position relative to their respective coin stacks;

FIG. 18 is a plan view, partially in section, of the dispenser of the present embodiment.

Referring first to the embodiment of FIGS. 1 to 8 herein and to the schematic circuit diagram of FIG. 12, the dispenser and the illustrated circuit are set up for a coin paying operation. It will be apparent from the discussion to follow, however, that circuit components for coin changing operations may be substituted for the paying arrangement without departing from the scope of this invention as pertains to the coin dispenser unit per se.

It will be observed that the dispenser unit, indicated generally by the reference numeral 20, comprises a base 21 supported by cushioning resilient pedestals 22, and which is preferably enclosed at the top and rear by means of an L-shaped sheet metal panel 23. The base 21 is further arranged to support a coin tray 24 at the front side thereof and which, in the case of the present embodiment, is affixed to the base. The base 21 further includes a front chute wall 25 and a rear chute wall 26 affixed thereto by means of spot welding or other means of attachment. The chute walls 25 and 26 define a coin chute containing a tiltable runway 27 therein and arranged for pivotal support (see FIG. 5) between the front and rear chute walls 25, 26 on pivot pins 28, links 29 and shoulder link pivot screws 30, and more fully described and claimed in Patent No. 2,952,348 for Coin Delivery Chute, granted to Arnold R. Buchholz and Frank Haban on September 13, 1960, and assigned to the same assignee as the present application. The runway 27 may be prepositioned in the dispenser 20 before using it, or it can be adjustable from the outside of the dispenser by a manually rotatable knob (not shown). The coin tray 24 includes a series of coin channels A, B, C, D, E, F, G and H (see FIGS. 7 and 8), wherein channels A, B and C are each arranged to receive a stack of 1¢ coins (two cents being dispensed from channels B and C during a single operation of the dispenser when called for), channel D a stack of nickels, channels E and F stacks of dimes, respectively, channel G a stack of quarters, and channel H a stack of half-dollars. The view of FIG. 1 has been taken through channel A for purposes of illustration, but it will be apparent that the operating components will act in similar manner relative to coins dispensed from the other channels under desired preselected conditions described hereinbelow.

The channels A, B, C, D, E, F, G and H each contain a longitudinal guide slot 31, and as previously stated, the coins, which will herein bear the general reference numeral 35, are disposed in stacked relationship in their respective channels and rest upon coin elevators 36. The elevators 36 are spring loaded, by means of a tension spring 37, to be urged in an upward direction, and include a webbed portion 32 arranged for sliding relationship with the respective guide slots 31, to thereby force the coins 35 against the finger plate 38. The finger plate 38 extends across the top of the machine and is slotted at **38*a* at each channel. The finger plate 38 has attached to the front thereof a coin stripper 38*b* notched at each channel and bent downwardly to retain the uppermost coins therein. The elevator 36 includes an outwardly extending tab 39 for manually forcing the same downwardly against the action of the spring 37 for purposes of loading a stack of coins. Attached to each of the elevators 36 is a tripper finger 40 and which tripper finger is arranged to contact a projection on and depress a rocker member 41 (see also FIG. 4) when a respective coin stack 35 has reached a predetermined depletion level. The rocker member 41 extends across the length of the dispenser 20 for actuation by each of the tripper fingers 40 of the respective elevators 36 operating in each of the coin channels. The rocker member 41 is pivoted on shoulder screws 42 (see FIG. 5) attached to oppositely disposed brackets 43 each bracket being affixed to the forward chute wall 25. Attached to the rocker 41 is an adjustable switch actuating screw 44 arranged for operation of an actuator 45 of a switch 46**, which switch is arranged for energizing a red indicating light RL (see the circuit diagram of FIG. 12 and the keyboard of FIG. 11). Energization of the indicator light RL warns the operator that one or more of the coin channels is in a state of near depletion. The signal for depletion may be varied, but it is the usual practice to provide a signal to the operator that only one additional operation of the machine can be made before the machine locks out, as will hereinafter be described.

The sequence of operation of the dispenser 20 is such that when a payment is required of the dispenser, a switch or combination of switches is closed in the keyboard (generally designated by the reference numeral 50 in FIGS. 11 and 12) a prime mover 51 will then be energized. The prime mover 51 may take the form of a motor, a rotary solenoid, or a straight push or pull type solenoid. Keyed to the shaft 52 is a bell crank lever 53 pivotally attached to a link 54 by means of the shoulder screw 55. The prime mover 51 may be attached to the front chute wall 25 by means of a mounting bracket 56. The link 54 pivotally engages the upper bell crank lever 57 by means of a shoulder screw 58. The upper bell crank lever 57 is keyed to a shaft 59, which shaft extends across the dispenser 20 transversely of the coin channels, as shown in FIGS. 5 and 6, being rotatably supported in bearings 60 which are positioned in oppositely disposed brackets 61 and 62 mounted on the rear chute wall 26. Keyed to the shaft 59 are a series of finger crank levers 65, one of each coin channel, arranged for clockwise movement relative to the views of FIGS. 1, 2 and 3, upon downward motion of the link 54, as provided by the prime mover 51 and its bell crank lever 53.

Pivotally attached to the respective finger crank levers 65 are finger hooks 66 forming a part of links 68 pivotally mounted on the respective levers 65 by means of shoulder screws 67 (see also FIG. 6). At the hook end of the link 68 is a spacer washer 69 which acts with the screw 67 to form a guiding means for the finger hook 66 for operation in an elongated slot 70 of the selector lever 71. The selector levers 71 are individually and pivotally supported in spaced relationship on a stationary shaft 72 mounted in openings in the brackets 61 and 62. The individual selector levers are each operated from a respective solenoid S1¢, S2¢, etc., and are respectively biased for independent movement in a counterclockwise direction relative to FIGS. 1, 2 and 3 about shaft 72 by means of tension springs 73, the opposite ends of which are attached to a stationary upstanding spring support member 74 extending across the dispenser and attached to the finger plate 38. The selector levers 71 are respectively attached to plungers of the respective solenoids S1¢, S2¢, S2¢A, S5¢, S10¢, S10¢A, S25¢ and S50¢ by means of the solenoid links 75.

The finger hook 66 is arranged so that when it is pulled downwardly by the action of the respective solenoid, such as the solenoid S1¢, it will engage with a respective finger pad 76 by means of an upstanding portion **76*a*. The engagement of the members is shown in the view of FIG. 3. The finger pad 76 is arranged for longitudinal sliding motion in the elongated slot 38*a* of the finger plate 38, and includes a bevelled coin ejecting shoe 76*b* attached by means of spot welding to the underside of the pad 76. The finger pad 76 includes a shoulder 78 for clearance purposes. Contact of the shoe 76*b* of the pad 76 with the edge of a single coin or two coins (as in the case of the pennies stacked in channels B and C), whichever the case may be, will slide the coin or coins into the chute 25, 26 (see FIG. 3) The leading edge of the shoe 76*b* is bevelled to slightly less than the thickness of the respective coin or two coins as the case may be. Thus, as the shoe 76*b* slides the coin or coins away from the stack, it will also act to push down on the remaining coin stack to relieve the friction forces exerted on the coin being ejected. A tension spring 79 is fastened at one end to an upstanding edge 77 of the finger plate 38 and at its opposite end to the upwardly bent portion 76*a* of the finger pad 76 to bias the pad towards its return position as shown in FIGS. 1 and 2. The spring 73 is positioned to normally urge the selector lever 71 about the shaft 72 in a counterclockwise direction relative to FIGS. 1–3, and with the hook 66 being urged towards disengagement with the finger pad portion 76*a***.

It is to be noted that the elevator 36 includes a laterally extending projection or stop 81 which is arranged to engage the inner edge of the shoe **76*b* and act as a stop for movement of the respective finger pads 76** when the coins of a respective channel have been fully depleted. This action is illustrated in the view of FIG. 1*a*.

With reference to FIGS. 9 and 10, the present invention further contemplates the provision of means for normally retaining the stack of coins 35 in position while a coin or coins, as the case may be, are being removed from the respective channels. That is, the rear wall of the tray 24 includes at its upper edge a re-entrant bore 82, in the case of the single feed coin channel, such as channel A. Seated in the bore 82 are a compression spring 83 and a steel ball 84. The ball 84 cooperates with the undersurface of the finger plate 38 to provide a spring biased gate for retaining the uppermost coins in their respective stacks 35, and thereby prevent them from being moved into the coin delivery chute unless called for. In the case of double coin dispensing, as from channels B and C, the gating construction is modified in accordance with the illustration of FIG. 10, but with the same lower gate construction of the bore 82 in the rear wall of the tray 24, the compression spring 83 and the steel ball 84. Here, however, the ball 84 cooperates with an upper steel ball 85, which is seated in an opening in the finger plate 38. The ball 85 is biased towards seating engagement therein by means of a leaf-spring 86 which is fastened at its opposite end to the upper surface of the plate 38 by means of a rivet 87. Thus, where a single coin is removed by means of the shoe **76*b*, as shown in FIG. 3, the single coin channel A will be provided with a gate to prevent other coins from accidentally being carried along by vibration friction or for other reason. In the case of the channels such as channels B and C, the upper ball 85 will contact the upper coin of the remaining coins in the stack and the lower ball 84 will contact the edge of a lower remaining coin which is standing in readiness for removal, and thereby prevent the coins from being removed until such time as the appropriate selector lever 71** has been activated by means of its respective solenoid S2¢ or S2¢A.

With reference to FIG. 4, it will be noted that rotatable shaft 59 includes a cam 90 at one end thereof, which cam also includes a cam lobe 91 engageable with the actuator 92 of a prime mover cut-off switch 93, which switch is arranged, as will later be described, to interrupt the power to the prime mover 51 and to each of the selector solenoids S1¢, S2¢, etc., at the end of the stroke of the stroke of the respective bell crank levers 65. The prime mover 51 is spring returned to its original starting position by means of a tension spring 95 fastened at one end to the upper end of the front chute wall 25 and at the other end thereof to the link 54 (see FIG. 1).

It is to be further noted that the coin stripper **38*b* is bent downwardly at its outer end to provide a stripper portion 96** at each channel (see FIGS. 1*a* and 7) which will prevent the uppermost coins of the stack 35 to be removed from the stack by frictional forces upon return of the finger pad 76 to its rest position after the dispenser 20 has been operated.

Referring to FIG. 12, it will be noted that the electric circuit components controlling the operation of a dispenser having been segregated with certain of the components indicated as enclosed within the keyboard 50. The remaining components are all contained within the housing of the dispenser unit 20. Current is supplied to the units through a supply line 100 through a fuse 101 and branch conductors 102 and 103. The conductor 103 includes a manually operated switch HS which is located on the keyboard 50. It is to be noted that each of the conductors leading into the keyboards 50 are preferably separably connected thereto through a multiple removable cable connector (not shown). The conductors are herein indicated schematically as being in connected position with conductors of the keyboard 50. The keyboard 50 may include a row of tens keys, TK, and a row of digit keys, DK, along with a row of special keys, SK, used for split-change purposes. The remote control keyboard 50 is shown here for illustrative purposes only and is more specifically described and claimed in the co-pending application, Serial No. 782,346, now Patent 3,020,916 for Electrically Controlled Coin Dispensing Machine, filed by Arnold R. Buchholz and Frank Haban, on December 16, 1958, and assigned to the same assignee as the present invention. Each of the keys of the rows TK, DK and SK are arranged to activate certain circuit controlling switches by means of rockers arranged to select certain combinations of switches for dispensing the least number of coins from the dispenser.

The respective keys of the keyboard 50 control the operation of the switches identified in the view of FIG. 12 as 1¢, 2¢, 2¢A, 5¢, 5¢A, 10¢, 10¢A, 25¢, 50¢ and the switch MS, which switch controls the circuit providing power to the prime mover 51. The following table indicates which of the respective tens or digit keys operate the switches of FIG. 12.

*Table I*

| The DK key: | |
|---|---|
| 1 | MS, 1¢. |
| 2 | MS, 2¢A. |
| 3 | MS, 1¢, 2¢. |
| 4 | MS, 2¢, 2¢A. |
| 5 | MS, 5¢. |
| 6 | MS, 5¢, 1¢. |
| 7 | MS, 5¢, 2¢A. |
| 8 | MS, 5¢, 2¢, 1¢. |
| 9 | MS, 5¢, 2¢, 2¢A. |
| 0 | MS. |
| **The TK key:** | |
| 1 | 10¢. |
| 2 | 10¢, 10¢A. |
| 3 | 25¢, 5¢A. |
| 4 | 25¢, 10¢, 5¢A. |
| 5 | 50¢. |
| 6 | 50¢, 10¢. |
| 7 | 50¢, 10¢, 10¢A. |
| 8 | 50¢, 25¢, 5¢A. |
| 9 | 50¢, 25¢, 10¢, 5¢A. |
| **The SK key:** | |
| 5 | MS, 1¢, 2¢, 2¢A. |
| 10 | MS, 1¢, 2¢, 2¢A, 5¢A. |
| 25 | MS, 10¢, 10¢A, 5¢A. |
| 50 | MS, 25¢, 10¢, 10¢A, 5¢A. |
| 100 | MS, 50¢, 25¢, 10¢, 10¢A, 5¢A. |

One side of each of the switches 1¢, 2¢, 2¢A, 5¢A, 10¢, 10¢A, 25¢, 50¢, 5¢ and MS is connected with the conductor 103 either directly or by means of a common conductor 104 supplied from the normally closed connection of switch 10¢A and its conductors 105 and 106 or from the normally closed connection of the 5¢ switch and its conductor 107. The coils of solenoids S1¢, S2¢, S2¢A, S10¢ and S50¢ are directly connected across the conductor 103 and a conductor 108 by means of conductors 109, 110, 111, 112 (through conductor 104) and 113 (through conductor 104), respectively. The conductor 108 connects with normally open switch 114 to a return line conductor 115 by means of branch line **108*a***.

The switch 5¢A in its normal position connects conductor 104 with a conductor 116 having a normal open relay operated switch 117 connected thereto and being connected at its opposite side with a conductor 118 and to the solenoid S5¢ upon closure of switch 117, as will hereinafter be described. In its operating position the switch 5¢A connects with the solenoid S5¢ by means of a conductor 119, normally closed relay operated switch 120, conductor **120*a* and the coil of the solenoid S5¢. Switch 10¢A, in its normal operating position, provides a connection for supplying current to the common conductor 104 from line 103 through branch line 106, even though switch 5¢** may have been moved to circuit open position.

The switch 10¢A, when moved to its second position, connects conductor 103 with the S10¢ solenoid and thence to conductor 108 by means of conductor 105, the switch 10¢A, conductor **105*a*, a relay operated dual position switch 122, conductor 121 and the solenoil S10¢A. Conductor 121 also connects with the second position contact of the switch 120. It will thus be apparent that closure of switch 5¢A may permit current to take alternate paths, either to the solenoid S5¢ when switch 120 is in its normal operating position, as shown, in connection with conductor 120a, or to the solenoid S10¢A upon movement of switch 120 to its second operating position in connection with the conductor 121 for energizing solenoid S10¢A. Both switches 117 and 120** are operated by the relay coil CR3.

Switch 25¢ connects conductor 103 directly with the solenoid S25¢ by means of conductors 124 and 124a.

Switch 5¢ connects conductor 103 with the common conductor 104 when in its normal operating position through conductor 107, and when moved to its other position, connects conductor 103 with the solenoid CR3 through conductor 124. The other side of the coil of the relay solenoid CR3 is connected to the return line 115 by means of conductor 126.

The switch MS, which controls the operation of the prime mover 51, acts to connect the conductor 103 with the prime mover upon depression of any one of the digit keys DK, or special keys SK, as will be observed from Table I. Upon closure of switch MS, the connection from conductor 103 is made through conductor 127, conductor 127a, through the double pole switch 93, the conductor 128, a normally closed relay operated switch 129, a conductor 130, through the coil of a relay CR2, the conductor 131, and from there to the return line 115. The prime mover will be caused to operate upon closure of the CR2 switch 132 to complete the circuit from the branch line 102 to the return line 115. Thus, the prime mover 51 will operate the various components of the dispenser 20 upon closure of the relay operated switch 132 by means of the then energized coil of the relay CR2. Energizaiton of the solenoid CR2 also acts to close the switch 114 to place the solenoids S1¢, S2¢, etc., in circuit with the return line 115. After the cam lobe 91 of the cam 90 has moved the actuator of the normally closed switch 93 to its second operating position, the circuit will then be interrupted to the relay CR2 for release of its switches 114 and 132 to interrupt the dispenser cycle.

Should one or more of the finger pads 76 be restricted in its movement upon engagement of its shoe 76b with the elevator stop 81 (see FIG. 1a), due to the absence of a coin for payment, it will also become necessary to interrupt the circuit to the prime mover 51 and the various selector solenoids S1¢, S2¢, etc. The present dispenser circuit permits the application of two alternative methods to accomplish this purpose. First, a time delay relay TD is provided and is arranged to operate the double-throw switch 135, having its normal position connecting the line 102 with the prime mover 51, then to the return line 115 by means of a branch line 136. The circuit to the coil of relay TD is completed through conductors 139 and 140. Another conductor 137 connects the switch 135 with the line 102 upon closure of switch 132 by means of the relay CR2 upon closure of the switch MS upon depression of any one of the digit keys DK. However, movement of the switch 135 to its second operating position will be delayed because of the nature of the relay TD, and the prime mover 51 will be permitted to run out its cycle to rotate the cam 90 to interrupt the circuit. However, if a coin channel becomes depleted, or a bent coin interferes with the operation, then the prime mover will be stopped in its rotation and the completion of the time delay period will permit the TD relay switch 135 to be moved to its second position, the time delay period being chosen to be in excess of that normally required to operate the dispenser components to dispense coins therefrom.

Should the time delay cycle permit the switch 135 to be moved to close the circuit between conductor 102, switch 132, conductor 137 and conductor 141 to the branch line 142 and the relay CR1, connected to the return line 115 by means of conductor 143, the CR1 relay operated switches will then be caused to move to their other operating positions. Normally, when there is no depletion or jamming, when the cam lobe 91 moves the switch 93 to its other operating position current will be established between the conductor 103, through the then closed switch MS to the conductor 127a, the switch 93 (in its other position) and thence to a conductor 141 to permit current to flow to the coil of the relay CR1 through the line 142, the said coil, the branch line 143 to the return line 115. Thus, operation of the relay CR1 will be effected in any case to release the keys and other components to begin a new cycle.

Movement of the CR1 relay switches 129 and 146 will cause interruption of the circuit to relay CR2 for opening of switches 114 and 132 to interrupt the circuits to the selector solenoids 1¢, 2¢, etc., and to the prime mover 51, respectively. The prime mover will be returned (in the case of a solenoid) to its start position by spring 95 acting on link 54. At the same time, since the key operated switch MS is still in circuit-closed position, current will be supplied from conductor 103 through the switch MS to the branch line 127a to a conductor 145 to one side of the relay operated switch 146, which will have previously been moved to its closed position by actuation of switch 93 or by closure of TD relay switches 135, and thereby complete the circuit through a conductor 147 to the coil of a key release solenoid SA disposed in the keyboard 50. The solenoid SA acts to release a latch holding the key operated rockers (not shown) of the keyboard to release each of the keys for another operating cycle. The operation has been fully disclosed in the aforementioned application, Serial No. 782,346. The other side of the coil of the solenoid SA is connected with a branch conductor 148 and thence to return line 115.

A conductor 149 provides current to an indicating light GL, which may be of a green color, to indicate that the circuit has been closed by means of the manually operated switch HS. As aforementioned, closure of the switch 46 by means of the tripper finger 40 of any one of the elevators 36 will cause the red warning light RL to be energized for indicating a near depletion of coins in one or more of the coin channels of the coin tray 24.

Should any one of the coin channels be depleted upon depression of a key controlling the respective solenoid, and the respective finger pad be held from movement by the projection 81 of an elevator, depression of the Lock Release key (see FIG. 11) and maintenance of the key in depressed position by latching means (not shown), will cause the switch LRS to again energize the circuit after the time delay period has expired for the relay TD. Should the particular depleted coin not be necessary for making up the number of coins to be dispensed (as in the case of a penny when only a nickel is required), the remaining channels will be permitted to function, or should a multilated coin be jammed in its passageway, this coin will not be ejected from the coin tray 24. The circuit may be cleared by means of the Lock Release key actuating switch LRS for supplying current from conductors 103 through line 141 to branch line 147a to the key release solenoid SA for release of the keyboard keys.

With the circuit arrangements above described, if the operator presses down on any one of the digit keys DK, shown in FIG. 11, from 1 to 9, the corresponding amount in cents value will be dispensed by the machine. When a selected DK key is depressed, it serves, in one of its functions, to actuate the prime mover switch MS, which switch is also operated by the zero key. For instance, when the number 1 DK key is depressed, it will act to close the switch 1¢ and current will then flow from the line 103, through the previously closed manually operated switch HS, the switch 1¢, conductor 109, the coil of solenoid S1¢, conductor 108 to the switch 114. At the same time, closure of the prime mover switch MS by the same key DK1 will complete the circuit from the power line 103 through the switch MS, conductor 127a, the switch 93, conductor 128, the normally closed switch 129, the conductor 130, the coil of the relay CR2, the line 131 and the return line 115. The circuits to the coil of the relay CR2 will then be completed through the branch conductors 131 to the return line 115. Energization of the relay will serve to close the switch 114 to complete the circuit through the solenoid S1¢ and the common conductor 108 to the return line 115. Closure of the relay CR2 will also cause the switch 132 to be closed to provide current from the incoming line 100, through the branch 102, the then closed switch 132, the conductor 137, the switch 135 in its normal operating position, the conductor 136 and the prime mover 51 to the return line 115 for operation of the prime mover 51.

Energization of the solenoid S1¢ will thereby cause the selector lever 71 for that solenoid to be rocked in a clockwise direction will reference to FIGS. 1, 2 and 3, about its shaft 72 by means of the solenoid link 75. Such action will cause the finger hook 66 to engage with the upstanding portion 76a of the finger pad 76. At the same time, since the prime mover 51 has been energized, it will rotate its bell crank lever 53 to pivotally actuate the link 54 in a downward direction against the bias of the return spring 95. A slight amount of play is permitted between the hook ends of the respective finger hook 66 and the respective portions 76a to permit the proper sequence of operation and to permit a slight time lag for all of the various solenoid finger hooks 66 to be engaged before the rest of the cycle takes place. The finger hook 66 will next be caused to be pulled towards the left as shown in the views of FIGS. 1–3, as the link 54 acts upon the upper bell crank lever 57 to rotate it about its shaft 59. The finger crank lever 65 actuated by the shaft 59 will then operate to pull its respective link 68 to move the shoulder screws 67 in the slot 70 of the respective selector lever 71. The finger pad 76 will then be moved towards the left to the position of FIG. 3, and its shoe 76b will engage the uppermost coin, or coins, for forcing the coin or coins through the resilient gate provided by the ball 84 in the plate 38 and drop the same into the chute defined by the members 25 and 26 onto the coin runway 27 for dispensing into an appropriate coin receiver.

Upon completion of the operation, the coin stack 35 will be moved upwardly by means of the spring biased elevator 36. At such position as the tripper finger 40 of the elevator 36 may engage the rocker 41, the switch 46 will be caused to be moved to circuit closed position to energize the lamp RL as a means of warning the operator of near depletion of coins in the particular stack or stacks of coins.

As the shaft 59 continues in its rotation under the influence of the link 54, it will cause its cam 90 and cam lobe 91 thereon to engage the actuator of the switch 93 and cause the switch to move to its other operating position to close the circuit from the conductor 103 through the still closed switch MS, to the conductor 127a, and now to the conductors 141, 142 and 147a to thereby energize the solenoid SA for release of the various keys and completion of the cycle. Interruption of the circuit to the conductor 128 will also cause the relay CR2 to become deenergized and thereby release its contacts 114 and 132 to interrupt the circuit to the previously selected solenoid S1¢ and to the prime mover 51. Identical operations will take place in the case of operation of the switches 1¢, 2¢, 2¢A, 10¢A and 50¢.

In order to provide means for permitting the last number of coins to be dispensed for a given amount called for, additional circuit variations are employed in the case of actuation of the switches 5¢A, 10¢ and 5¢. Thus, a by-pass conductor 106 provides current from the incoming line 103 through the branch 105, the normally closed switch 10¢A to the switch 10¢. The by-pass 106 further functions to complete the circuit from line 103 to the 5¢A switch and to the 10¢ switch through line 104 when the 5¢ switch has been moved to its other operating position, as will hereinafter be described.

The circuit for a paying coin dispensing operation has been relatively simplified by the present invention, and includes only one transfer type relay CR3 for dispensing the least amount of coins to make up the desired change. That is, in the description to follow it is to be noted that when both the 5¢ and 5¢A switch are simultaneously actuated to their other than normal operating positions by their respective keys, a 10¢ coin will be paid by means of the solenoid S10¢A, inasmuch as the switch 5¢ will have energized the relay CR3 to cause the switch 120 to be moved to its other position connecting line 121 with line 119. The switch 5¢A, having been moved to its second operation position, will connect conductor 104, 106, normally closed switch 10¢A, conductor 105 with power conductor 103 to permit current to flow from the line 103 through the branch 105, the switch 10¢A, line 106, conductor 104, switch 5¢A, line 119, then closed switch 120, conductor 121 to the solenoid S10¢A. In addition, it is also to be noted that the relay CR3 controls switch 122 to alternatively permit payment of a 10¢ coin, when in its normal position, upon closure of switch 10¢A through operation of solenoid S10¢A, and on the contrary, a 25¢ coin, when moved to its other position by relay CR3 upon closure of switch 5¢. In the latter case, the circuit from switch 10¢A will be completed through the then moved switch 122, through line 124a to solenoid S25¢. It will also be noted that actuation of the switch 10¢A to contact position with line 105a will interrupt the circuit from 103 through branch line 106, whereby energization of the circuits will require current supply through branch line 107 and switch 5¢. Thus, at no time will both the switches 5¢ and 10¢A be moved to their respective second operating positions unless a 25¢ coin is to be paid out, and then only when the amount is either from 25¢ to 29¢ or from 75¢ to 79¢.

The following table, taken in connection with FIG. 12 of the drawings, provides ready reference to the minimum amount of coins dispensed to provide a given amount of change, and also to the switches actuated upon depression of selected keys, which together provide the desired change to be dispensed.

*Table II*

| Amount to be dispensed | Least number of coins | | | | | | | | | Switches actuated (See also chart I) | | | | | | | | | |
|---|---|---|---|---|---|---|---|---|---|---|---|---|---|---|---|---|---|---|---|
| | | | | | | | | | | SK controlled | | | | | TK controlled | | | | |
| | 1¢ | 2¢ | 3¢ | 4¢ | 5¢ | 10¢ | 10¢ | 25¢ | 50¢ | MS | 1¢ | 2¢ | 2¢A | 5¢ | 5¢A | 10¢ | 10¢A | 25¢ | 50¢ |
| 1 | X | ---- | ---- | ---- | ---- | ---- | ---- | ---- | ---- | X | X | ---- | ---- | ---- | ---- | ---- | ---- | ---- | ---- |
| 2 | ---- | X | ---- | ---- | ---- | ---- | ---- | ---- | ---- | X | ---- | ---- | X | ---- | ---- | ---- | ---- | ---- | ---- |
| 3 | ---- | ---- | X | ---- | ---- | ---- | ---- | ---- | ---- | X | X | X | ---- | ---- | ---- | ---- | ---- | ---- | ---- |
| 4 | ---- | ---- | ---- | X | ---- | ---- | ---- | ---- | ---- | X | ---- | X | X | ---- | ---- | ---- | ---- | ---- | ---- |
| 5 | ---- | ---- | ---- | ---- | X | ---- | ---- | ---- | ---- | X | ---- | ---- | ---- | X | ---- | ---- | ---- | ---- | ---- |
| 6 | X | ---- | ---- | ---- | X | ---- | ---- | ---- | ---- | X | X | ---- | ---- | X | ---- | ---- | ---- | ---- | ---- |
| 7 | ---- | X | ---- | ---- | X | ---- | ---- | ---- | ---- | X | ---- | ---- | X | X | ---- | ---- | ---- | ---- | ---- |
| 8 | ---- | ---- | X | ---- | X | ---- | ---- | ---- | ---- | X | X | X | ---- | X | ---- | ---- | ---- | ---- | ---- |
| 9 | ---- | ---- | ---- | X | X | ---- | ---- | ---- | ---- | X | ---- | X | X | X | ---- | ---- | ---- | ---- | ---- |

*Table II*—Continued

| Amount to be dispensed | Least number of coins | | | | | | | | | Switches actuated (See also chart I) | | | | | | | | | |
|---|---|---|---|---|---|---|---|---|---|---|---|---|---|---|---|---|---|---|---|
| | 1¢ | 2¢ | 3¢ | 4¢ | 5¢ | 10¢ | 10¢ | 25¢ | 50¢ | SK controlled | | | | | TK controlled | | | | |
| | | | | | | | | | | MS | 1¢ | 2¢ | 2¢A | 5¢ | 5¢A | 10¢ | 10¢A | 25¢ | 50¢ |
| 10 | | | | | | X | | | | X | | | | | | X | | | |
| 11 | X | | | | | X | | | | X | X | | | | | X | | | |
| 12 | | X | | | | X | | | | X | | | X | | | X | | | |
| 13 | | | X | | | X | | | | X | X | X | | | | X | | | |
| 14 | | | | X | | X | | | | X | | X | X | | | X | | | |
| 15 | | | | | X | X | | | | X | | | | X | | X | | | |
| 16 | X | | | | X | X | | | | X | X | | | X | | X | | | |
| 17 | | X | | | X | X | | | | X | | | X | X | | X | | | |
| 18 | | | X | | X | X | | | | X | X | X | | X | | X | | | |
| 19 | | | | X | X | X | | | | X | | X | X | X | | X | | | |
| 20 | | | | | | X | X | | | X | | | | | | X | X | | |
| 21 | X | | | | | X | X | | | X | X | | | | | X | X | | |
| 22 | | X | | | | X | X | | | X | | | X | | | X | X | | |
| 23 | | | X | | | X | X | | | X | X | X | | | | X | X | | |
| 24 | | | | X | | X | X | | | X | | X | X | | | X | X | | |
| 25 | | | | | | | | X | | X | | | | X | | X | X | | |
| 26 | X | | | | | | | X | | X | X | | | X | | X | X | | |
| 27 | | X | | | | | | X | | X | | | X | X | | X | X | | |
| 28 | | | X | | | | | X | | X | X | X | | X | | X | X | | |
| 29 | | | | X | | | | X | | X | | X | X | X | | X | X | | |
| 30 | | | | | X | | | X | | X | | | | | X | | | X | |
| 31 | X | | | | X | | | X | | X | X | | | | X | | | X | |
| 32 | | X | | | X | | | X | | X | | | X | | X | | | X | |
| 33 | | | X | | X | | | X | | X | X | X | | | X | | | X | |
| 34 | | | | X | X | | | X | | X | | X | X | | X | | | X | |
| 35 | | | | | | X | | X | | X | | | | X | X | | | X | |
| 36 | X | | | | | X | | X | | X | X | | | X | X | | | X | |
| 37 | | X | | | | X | | X | | X | | | X | X | X | | | X | |
| 38 | | | X | | | X | | X | | X | X | X | | X | X | | | X | |
| 39 | | | | X | | X | | X | | X | | X | X | X | X | | | X | |
| 40 | | | | | X | X | | X | | X | | | | | X | X | | X | |
| 41 | X | | | | X | X | | X | | X | X | | | | X | X | | X | |
| 42 | | X | | | X | X | | X | | X | | | X | | X | X | | X | |
| 43 | | | X | | X | X | | X | | X | X | X | | | X | X | | X | |
| 44 | | | | X | X | X | | X | | X | | X | X | | X | X | | X | |
| 45 | | | | | | X | X | X | | X | | | | X | X | X | | X | |
| 46 | X | | | | | X | X | X | | X | X | | | X | X | X | | X | |
| 47 | | X | | | | X | X | X | | X | | | X | X | X | X | | X | |
| 48 | | | X | | | X | X | X | | X | X | X | | X | X | X | | X | |
| 49 | | | | X | | X | X | X | | X | | X | X | X | X | X | | X | |
| 50 | | | | | | | | | X | X | | | | | | | | | X |
| 51 | X | | | | | | | | X | X | X | | | | | | | | X |
| 52 | | X | | | | | | | X | X | | | X | | | | | | X |
| 53 | | | X | | | | | | X | X | X | X | | | | | | | X |
| 54 | | | | X | | | | | X | X | | X | X | | | | | | X |
| 55 | | | | | X | | | | X | X | | | | X | | | | | X |
| 56 | X | | | | X | | | | X | X | X | | | X | | | | | X |
| 57 | | X | | | X | | | | X | X | | | X | X | | | | | X |
| 58 | | | X | | X | | | | X | X | X | X | | X | | | | | X |
| 59 | | | | X | X | | | | X | X | | X | X | X | | | | | X |
| 60 | | | | | | X | | | X | X | | | | | | X | | | X |
| 61 | X | | | | | X | | | X | X | X | | | | | X | | | X |
| 62 | | X | | | | X | | | X | X | | | X | | | X | | | X |
| 63 | | | X | | | X | | | X | X | X | X | | | | X | | | X |
| 64 | | | | X | | X | | | X | X | | X | X | | | X | | | X |
| 65 | | | | | X | X | | | X | X | | | | X | | X | | | X |
| 66 | X | | | | X | X | | | X | X | X | | | X | | X | | | X |
| 67 | | X | | | X | X | | | X | X | | | X | X | | X | | | X |
| 68 | | | X | | X | X | | | X | X | X | X | | X | | X | | | X |
| 69 | | | | X | X | X | | | X | X | | X | X | X | | X | | | X |
| 70 | | | | | | X | X | | X | X | | | | | | X | X | | X |
| 71 | X | | | | | X | X | | X | X | X | | | | | X | X | | X |
| 72 | | X | | | | X | X | | X | X | | | X | | | X | X | | X |
| 73 | | | X | | | X | X | | X | X | X | X | | | | X | X | | X |
| 74 | | | | X | | X | X | | X | X | | X | X | | | X | X | | X |
| 75 | | | | | | | | X | X | X | | | | X | | X | X | | X |
| 76 | X | | | | | | | X | X | X | X | | | X | | X | X | | X |
| 77 | | X | | | | | | X | X | X | | | X | X | | X | X | | X |
| 78 | | | X | | | | | X | X | X | X | X | | X | | X | X | | X |
| 79 | | | | X | | | | X | X | X | | X | X | X | | X | X | | X |
| 80 | | | | | X | | | X | X | X | | | | | X | | | X | X |
| 81 | X | | | | X | | | X | X | X | X | | | | X | | | X | X |
| 82 | | X | | | X | | | X | X | X | | | X | | X | | | X | X |
| 83 | | | X | | X | | | X | X | X | X | X | | | X | | | X | X |
| 84 | | | | X | X | | | X | X | X | | X | X | | X | | | X | X |
| 85 | | | | | | X | | X | X | X | | | | X | X | | | X | X |
| 86 | X | | | | | X | | X | X | X | X | | | X | X | | | X | X |
| 87 | | X | | | | X | | X | X | X | | | X | X | X | | | X | X |
| 88 | | | X | | | X | | X | X | X | X | X | | X | X | | | X | X |
| 89 | | | | X | | X | | X | X | X | | X | X | X | X | | | X | X |
| 90 | | | | | X | X | | X | X | X | | | | | X | X | | X | X |
| 91 | X | | | | X | X | | X | X | X | X | | | | X | X | | X | X |
| 92 | | X | | | X | X | | X | X | X | | | X | | X | X | | X | X |
| 93 | | | X | | X | X | | X | X | X | X | X | | | X | X | | X | X |
| 94 | | | | X | X | X | | X | X | X | | X | X | | X | X | | X | X |
| 95 | | | | | | X | X | X | X | X | | | | X | X | X | | X | X |
| 96 | X | | | | | X | X | X | X | X | X | | | X | X | X | | X | X |
| 97 | | X | | | | X | X | X | X | X | | | X | X | X | X | | X | X |
| 98 | | | X | | | X | X | X | X | X | X | X | | X | X | X | | X | X |
| 99 | | | | X | | X | X | X | X | X | | X | X | X | X | X | | X | X |

It will be apparent that whenever change from one cent to five cents is required, only the DK keys 1–9, respectively, will be depressed, and it will be noted from Table II that the keys, by means of their rockers (not shown), actuate appropriate switches 1¢, 2¢, 2¢A, or 5¢ to provide summations thereof for amounts up to and including nine cents by simple addition of the coins dispensed from the respective channels A, B, C and/or D. As aforementioned, channels B and C are each adapted to dispense two pennies at one time. The circuits from the switches run directly from the power line 103 to the appropriate solenoids controlling the particular coins involved, and it is to be noted that the 5¢ switch is actuated upon depression of the digit key 5¢, of the column of keys DK, to dispense a nickel upon closure of the CR3 relay-operated switch 117, which connects line 103 through switch 10¢A, branch line 106, conductor 104, normally closed, dual position, switch 5¢A, line 116, switch 117, line 118 and the solenoid S5¢.

Payment is made in the same manner for amounts of ten cents to nineteen cents, inclusive, with the exception that depression of the tens key TK1 will cause the actuation of the 10¢ switch to dispense a dime, in addition to the appropriate penny and nickel combination, by the action of the then energized solenoid S10¢.

Again, the same circuits are employed for the dispensing of twenty cents to twenty-four cents, inclusive, with the exception that in this case the depression of the tens key TK2 (see Table II) will bring into actuation both the 10¢ and 10¢A switch to add two dimes to the respective number of pennies upon energization of both of the solenoids S10¢ and S10¢A.

The circuitry involving the payment of a quarter, as for instance, change between twenty-five cents to forty-nine cents and seventy-five cents to ninety-nine cents, inclusive, provides for a variation in circuit connection to provide the least number of coins for a given payment. That is, when payment of twenty-five cents to twenty-nine cents, inclusive, is required, it will be noted that the digit key DK5 is involved (see Table II) and actuates the switch 5¢ to move the same to its other operating position wherein (taking for example a payment of twenty-five cents, which merely involves a quarter to be dispensed), the circuit connections involve movement of switches 5¢, 10¢ and 10¢A to their other positions. Movement of the 10¢A key to its other position connects power line 103, through branch line 105*a*, through the switch 122, now moved to its second position by the relay CR3 upon movement of switch 5¢, to pay out a quarter on energization of the solenoid S25¢. It will be noted that although the switch 10¢ has also been closed upon depression of the tens key TK2, power will have been interrupted therethrough, because movement of both the switch 10¢A and the switch 5¢ to their respective second positions will interrupt current from the power line 103 to conductor 104. For amounts between twenty-six and twenty-nine cents the simple addition of appropriate switches 1¢, 2¢ and 2¢A is required.

Payment between thirty cents and thirty-four cents, inclusive, will require, in addition to the 1¢, 2¢ and 2¢A switches, as necessary, the use of the 5¢A switch and the 25¢ switch, both being controlled by the tens key TK3. Thus, a payment of 30¢ for the least number of coins will require a quarter and a nickel. It will be observed that here, switches 25¢ and 5¢A will be actuated to make this payment, and that depression of the zero digit key merely actuates the switch MS. However, the payment between thirty-five cents and thirty-nine cents, inclusive, to provide the minimum amount of coins, will require a payment of a quarter plus a dime, plus the additional pennies that may be involved. This requires a shift in circuitry, and it will be noted that the 5¢ switch will also be brought into play upon depression of any one of the digit keys DK5 to DK9, inclusive, to energize the transfer relay CR3. Thus, depression of the tens key TK3, in causing actuation of switches 5¢A and 25¢, will pay a quarter by means of energization of the solenoid S25¢ through conductor 124*a*, and a dime by virtue of the fact that the circuit from line 104 will now be connected from the actuated switch 5¢A to line 119, the then relay-operated switch 120, line 121 and the solenoid S10¢A for dispensing a dime along with the quarter.

For payment of amounts between forty cents and forty-four cents, the tens key TK4 will be depressed, and it will be noted from Table I that this causes actuation of switches 5¢A, 10¢ and 25¢ to be moved to their second position. Thus, in the case of dispensing forty cents, the least change involves a quarter plus a dime and a nickel. Where payment of forty-one to forty-four cents is involved, the switches 25¢, 10¢, and 5¢A will be brought into action along with the appropriate penny switches. The circuitry involved is uncomplicated and self-explanatory, as it does not involve a shift of the transfer relay CR3.

However, in the case of payment between forty-five cents and forty-nine cents, the least number of coins will include a quarter, two dimes and the appropriate number of pennies. Here, the operation of the 5¢ switch by the digit keys DK5–DK9, inclusive, will serve to pay a dime instead of a nickel as is the usual case. The payment is similar to that involving the payment of twenty cents to twenty-four cents, with the exception that a quarter is added in he present case upon depression of the tens key TK4. (See Table I.)

It will be noted that payments between fifty cents and ninety-nine cents, inclusive, are identical in operation and circuitry with the payments between one cent and forty-nine cents, with the exception that a half dollar is added upon actuation of the switch 50¢ by each of the tens keys TK5–TK9, inclusive. (See Table I.)

It will thus be apparent that the present dispenser circuit has been considerably simplified over past circuitry and involves only a single transfer relay for providing a minimum number of coins for a desired amount of change to be dispensed.

The present invention may take the form of an embodiment with a fixed coin tray as previously described, or may be modified within the scope thereof to provide a coin tray which may be removably attached to the dispenser unit. Thus, an operator in many instances may find it to be more convenient to remove the tray than remove coins from each channel at the close of business, or to count the remaining coins should there be a change of operators. Also, the operator may wish to remove the coin tray when it is not needed, and to place it in safekeeping away from access to the public.

The present embodiment, as particularly illustrated in the views of FIGS. 13 through 18, inclusive, permits the use of a removable coin tray without material change in height or in operating components, and which permits coins to be dispensed from the top of the machine, just as in the embodiment described above in connection with FIGS. 1–6, inclusive.

Throughout the several views of the present embodiment, like reference characters will be used to describe like parts previously described in connection with the first embodiment.

The removable coin tray of the present embodiment is designated generally by the reference numeral 160 and comprises an integral unit which may be die cast or otherwise formed to include a series of coin retaining channels A, B, C, D, E, F, G and H to respectively retain a column of coins which may be of the denominations 1¢ (single payment), 1¢ (double payment), 1¢ (double payment), 5¢, 10¢, 10¢, 25¢, 50¢. Each of the channels includes a longitudinal slot 161 at the rear thereof and a hollow base 162 for receiving an elevator 163. A stack of coins 164 is disposed in the appropriate channel and rests on a shoulder 165 of the tray 160, and which further defines an aperture 166 arranged for receiving the pressure pad 167 of the elevator 163. The slot is further formed in notched fashion to receive the laterally projecting stop 168 of the pressure pad 167. The elevator 163 is formed with a relatively thin web portion 169 slidable in the slot 161 of the coin tray 160. The uppermost coin of the coin stack 164 rests against a finger plate 170, which may be stamped and formed of sheet metal and secured to the top of the coin tray 160. The finger plate 170 includes a series of down-turned flange portions 171 which acts as an aid in retaining the coins within the channel and also functions as a means of retaining the coins in place when the finger pad is returned to original operating position as in the case of the element 96 of the first described embodiment.

The dispenser of the present embodiment includes, as described in the previous embodiment, a base 23 which supports a front chute wall 25, a rear chute wall 26, a removable cover member (not shown) and which is further modified to include an elevator guide plate 175. Also included are indexing pins 176 (see FIG. 15) arranged for seating engagement with corresponding openings in the base of the coin tray 160 and for retaining the same in operating position. The two extreme positions of the elevator are shown in FIG. 16 (the depleted position being in phantom view), and it is to be noted that the coin tray 160 may be removed from or seated in the dispenser only when all of the respective elevators for each of the coins have been brought to their lowermost or full line position and out of interference with the tray 160. In order to accomplish this, an elevator positioning and locking lever is provided, the action and component parts of which may be observed in connection with the views of FIGS. 15–18. The locking lever 180 is normally disposed in its locking position as shown in FIG. 15 and solid lines of FIG. 17 and includes an operating handle 181. The lever is affixed to an operative shaft 182 which shaft includes drive gears 183 disposed at opposite ends thereof in respective meshing engagement with pinions 186 affixed to opposite ends of a driven shaft 187. Attached to the shaft 187 are a series of torsion springs 188 (two of which are shown in FIG. 18, but of which there are a sufficient number to correspond with each of the respective channels A to H, inclusive). Attached to the opposite end of the torsion springs 188 are pulleys 189, which pulleys are rotatable relative to the shaft 187. Each of the pulleys 189 also includes an elevator lift strip 190 affixed thereto. The lift strip 190 is attached at its opposite end to the rear of the web portion 169 of the elevator 163 by means of rivets 191 or the like, and may be of resilient flexible metal or of any material suitable for wrapping around the pulley and exerting a force against the elevator for bias of the coin column 164 in its respective channel. It will be apparent as the shaft 187 is rotated in a counterclockwise direction with respect to FIG. 17, that it will drive the respective torsion springs 188, which in turn will drive their respective pulleys 189 for winding each of the elevator lift strips 190 spirally upon itself to bias the respective elevators 163 upwardly against the coin column 164, while being guided in the slot 161 of the coin tray 160.

Thus, upon moving the lever 180 in a counterclockwise direction relative to FIG. 17, the gear 183 will rotate the pinion 186 to rotate the shaft 187 in a clockwise direction to release the tension of the spring and permit the respective elevators 163 to be lowered to their lowermost position shown in the bold lines of FIG. 17, for assembly or removal of the coin tray 160 in the dispenser. Each stack of coins will then be spring loaded from the bottom and can then be paid out to depletion as in the first described embodiment. Such is provided for by rotating the shaft 187 in a counterclockwise direction to wind the respective torsion springs 188 against the action of the respective pulleys 189 working upon their respective lift strips 190. Though the coins in the respective channels are loaded at different heights or may be dispensed at different rates, tension will remain individually upon the respective stacks 164 of the coins through their independently tensioned lift strips 190.

Another mechanism that is operated when the locking lever 180 is rotated from the position shown in dotted lines on FIG. 17 to the position shown in bold lines, is the locking down of the finger guide plate 195 which acts to retain the coin tray 160 in place and permits operation of the various components for dispensing the coins as previously described in connection with the fixed coin tray embodiment. To more effectively illustrate the mechanism the gear 183 has been broken at its center to show the components therebehind. The finger guide plate 195 is hinged on a hinge pin 196 and it will be noted that the finger guide plate ear 197 is a part of the finger guide plate 195. Attached to the ear 197 is a shoulder screw 198 (see also FIG. 17) which acts as a pivot for one end of an L-shaped lever 199. The other end of the lever 199 is pivoted on an eccentric bearing 200 which is partially floating on the shaft 182. Pressed into the shaft 182 is a drive pin 201. Thus, as the locking lever 180 is rotated from the bold line position of FIG. 17 to the phantom line position of the same figure, the shaft 182 and the drive pin 201 will both be rotated counterclockwise relative to FIG. 17 in the direction of the arrows.

As part of the configuration of the eccentric bearing 200 a driving slot 202 is formed in the bearing, similar to a keyway, in such manner that as the shaft 182 and the drive pin 201 start to rotate in the said counterclockwise direction, the eccentric bearing 200 will not be rotated until the drive pin 201 will contact the edge of the keyway. The purpose for this is to relieve the spring load on the coin stacks 164 before permitting the finger guide plate 195 to be raised to the dotted line position of FIG. 17 or release of the coin tray. This will further insure that the top coin or coins in each stack will not slip through the coin chute defined by the walls 25 and 26 as an uncalled-for payment.

It will thus be apparent that the finger guide plate 195 is hinged at the end 196 to permit removal and insertion of the coin tray 160. As long as the finger guide plate 195 is locked down in the bold line position of FIG. 17, the coin tray 160 cannot be removed, because of locking engagement between the outer surface of the finger or stripper 171 of the coin tray with the finger guide plate 195. In addition, because of its design, the coin tray 160 cannot be removed from the dispenser unless all of the elevators have been lowered. The locating or indexing pins 176 are so positioned that the coin tray 160 must be removed by pulling the top of the coin tray outwardly away from the dispenser first and then lifting it off of its pins 176. It will be apparent that the present embodiment operates identically with the first mentioned embodiment when the coin tray 160 has been properly latched in place with the locking lever 180 locked to the locking position shown in the dotted lines of FIG. 17 and as shown in FIG. 18.

It will be noted that the rocker 203 (see FIG. 16) has been slightly modified from that of the first embodiment (rocker 41) to permit engagement therewith by projection 204 on the respective elevators 163 for actuation of the switch 46 to indicate when any one or more of the coin tray channels have been depleted to a predetermined indicating amount sufficient to energize the warning light RL.

It will be apparent that the coin gating means may be varied from the arrangement shown without departing from the scope of the present invention, wherein other biased detents may be substituted for the balls 84 and 85. That is, a rod with a normally protruding bevelled edge may be disposed in slidable relationship within the bore 82 (not shown) or a resilient leaf spring may be fastened to the tray 24 and disposed in the path of the coins either within the space defined by the top of the tray and the bottom surface of the element 38 (not shown), or at the back side of the tray 24 (not shown). It will be obvious however that the arrangement illustrated is preferred.

It will thus be apparent, in light of the foregoing description and drawings, that the present invention has provided an improved and mechanically simplified coin dispenser suitable for both coin payer and coin changer installations, and which further sets forth an electrical circuit of simplified arrangement for use with coin payer devices.

We claim:

1. In a coin dispensing machine, a coin tray disposed on an exterior face of the machine and having a coin dispensing channel arranged to hold a stack of coins, said channel provided with a longitudinal opening to the exterior of the machine and of a width adjacent an upper end of said tray sufficient to admit coins for loading of said channel, a coin supporting elevator slidable in said channel, biasing means urging said elevator upwardly of said channel, stop means for restricting upward movement of a stack of coins when supported by said elevator until such time as a coin or coins has been removed from the stack, means projecting from said elevator outwardly through said longitudinal opening for manual engagement to depress said elevator, a coin dispensing chute, means for removing a selected number of the uppermost coins from a channel supported stack of coins and including a coin engaging shoe having a leading edge engageable with the uppermost selected number of coins of the stack of coins, means for moving said shoe transversely of the stack of coins and into engagement with the coins to be dispensed, and means for returning said shoe to its normal operating position out of engagement with said coins upon completion of the coin dispensing operation.

2. The coin dispensing machine of claim 1, wherein said elevator is provided with stop means arranged for interrupting the transverse motion of said shoe upon depletion of the coins from said channel.

3. In a coin dispensing machine, a coin tray disposed on an exterior face of the machine and having a coin dispensing channel arranged to hold a stack of coins, said channel provided with a longitudinal opening to the exterior of the machine and of a width adjacent an upper end of said tray sufficient to admit coins for loading of said channel, a coin supporting elevator slidable in said channel, biasing means for urging said elevator upwardly of said channel, stop means for restricting upward movement of a stack of coins when supported by said elevator until such time as a coin or coins has been removed from the stack, means projecting from said elevator outwardly through said longitudinal opening for manual engagement to depress said elevator, a coin dispensing chute, means for removing a selected number of the uppermost coins from a channel-supported stack of coins and comprising a coin engaging shoe having a leading edge engageable with the uppermost selected number of coins of the stack of coins, means for moving said shoe transversely of the stack of coins and into engagement with the coins to be dispensed, said means comprising an electroresponsive device, releasable shoe-engaging means controlled by said electroresponsive device, and a prime mover for moving said shoe into contact with and discharge of the selected coins into said chute when said shoe is operatively controlled by said electroresponsive device, and means for returning said shoe, said electroresponsive device and said prime mover to their respective normal operating positions upon completion of the coin dispensing operation.

4. In a coin dispensing machine, a coin tray disposed on an exterior face of the machine and having a coin dispensing channel arranged to hold a stack of coins, said channel provided with a longitudinal opening to the exterior of the machine and of a width adjacent an upper end of said tray sufficient to admit coins for loading of said channel, a coin supporting elevator slidable in said channel, guide means for slidably retaining said elevator in said channel, biasing means urging said elevator upwardly of said channel, a finger plate longitudinally spaced from the upper end of said channel and arranged to restrict upward movement of a stack of coins when supported by said elevator, means projecting from said elevator outwardly through said longitudinal opening for manual engagement to depress said elevator, a coin dispensing chute communicating with the space defined by said finger plate and the end of said channel, a coin-engaging shoe slidable in the said defined space and having a leading edge engageable with a selected number of the uppermost coins of the stack of coins, biasing means for normally urging said shoe towards disengagement with said coins; means for moving said shoe in said space for discharge of the selected uppermost coin or coins into the said coin chute, said means including a hook-like member releasably engageable with said shoe, an electroresponsive device arranged upon energization thereof to engage said hook-like member with said shoe, a prime mover in mechanical connection with said releasable hook-like member and arranged upon energization thereof to move said hook-like member and said shoe upon relative engagement thereof, to thereby cause the leading edge of said shoe to contact and slidably force the uppermost coin or coins from the stack of coins in said channel and into said coin dispensing chute, and means for interrupting current flow to said electroresponsive device and to said prime mover to permit said hook-like member and said shoe to return to their respective normal operating positions upon the completion of a coin dispensing operation, and means partially blocking the upper limits of said longitudinal opening to prevent the discharge of the uppermost coins of the stack of coins to the exterior of the machine upon return of said shoe to its respective normal operating position.

5. In a coin dispensing machine, a coin tray having a coin dispensing channel arranged to hold a stack of coins and including a substantially coextensive longitudinal guide slot, a coin supporting elevator slidable in said channel and having a portion projecting through said guide slot, biasing means urging said elevator upwardly of said channel, a slotted finger plate longitudinally spaced from the upper end of said channel and arranged to restrict upward movement of the stack of coins when supported by said elevator, a coin dispensing chute communicating with the space defined by said finger plate, and the end of said channel, a finger pad slidable in the slot of the finger plate and including a shoe having a beveled leading edge engageable with a selected number of the uppermost coins of the stack of coins, biasing means for normally urging said shoe towards disengagement with said coins; means for moving said finger pad and shoe in said slot for movement of the selected number of coins into the said coin chute and comprising a link member terminating at one end in a hook-like projection, said projection being releasably engageable with said finger pad, means for normally urging the hook-like projection of said link member toward disengagement with the said pad, a slotted lever arranged to slidably receive and support said link member at its hook-like projection, pivot support means, for said lever, an electroresponsive device arranged upon energization thereof to rock said lever on its support in a direction toward engagement of said hook-like projection with said finger pad, a prime mover in mechanical connection with the other end of said link member and arranged upon energization thereof to slidably move said link in the slot of said lever upon engagement of said hook-like projection with said finger pad to thereby cause the leading edge of said shoe to contact the uppermost coin in said channel and slidably force the coin or coins from the stack of coins and into said coin dispensing chute; and means for interrupting current flow to said electroresponsive device and to said prime mover to permit said lever, said link member and said finger pad to return to normal operating position upon the completion of the coin dispensing operation.

6. In a coin dispensing machine, a coin tray defining an exterior front face of the machine, said coin tray having a plurality of coin dispensing channels each respectively arranged to hold a stack of coins, and each provided with a longitudinal opening in its front face of a width adjacent the upper end of said tray sufficient to admit coins for loading of the channel a coin supporting elevator slidable in each of said channels, biasing means urging said elevator upwardly of its channel, stop means for restricting upward movement of a respective stack of coins when supported by an elevator until such time as a coin or coins has been removed from the stack, a finger tab projecting outwardly from each elevator through the respective longitudinal opening for manual engagement to depress such elevator against the force of said biasing means, a coin dispensing chute, means for removing a selected number of the uppermost coins from a respective channel when retaining a stack of coins and including coin engaging shoes for each channel each having a leading edge engageable with the uppermost selected number of coins of a respective stack of coins, biasing means for normally urging each of said shoes towards disengagement with said coins, means for selectively moving a respective shoe transversely of its stack of coins and into engagement with the uppermost coin or coins to be dispensed into said coin chute, and means for returning the selected shoes to their respective normal operating position out of engagement with said coins upon completion of the coin dispensing cycle.

7. In a coin dispensing machine, a coin tray defining an exterior front face of the machine, said coin tray having a plurality of coin dispensing channels each respectively arranged to hold a stack of coins, and each provided with a longitudinal opening in its front face of a width adjacent the upper end of said tray sufficient to admit coins for loading of the channel, a coin supporting elevator slidable in each of said channels, biasing means urging said elevator upwardly of its channel, stop means for restricting upward movement of a respective stack of coins supported by an elevator until such time as a coin or coins has been removed from the stack, a finger tab projecting outwardly from each elevator through the respective longitudinal opening for manual engagement to depress such elevator against the force of said biasing means, a coin dispensing chute, means for removing a selected number of the uppermost coins from a respective channel when retaining a stack of coins and comprising a coin engaging shoe having a leading edge engageable with the uppermost selected number of coins of the respective stack of coins, biasing means for normally urging each of said shoes towards disengagement with said coins, means for selectively moving the respective shoes transversely of its stack of coins and into engagement with the coins to be dispensed, said means comprising a plurality of electroresponsive devices respectively controlling the dispensing of coins from each channel, releasable shoe engaging means respectively controlled by said electroresponsive devices, and a prime mover for simultaneously moving each of the shoes into contact with and discharge of the selected coin or coins into the said coin chute when said shoes have been selectively controlled by a respective electromagnetic device, and means for returning said shoes, said electromagnetic devices and said prime mover to their respective normal operating positions upon completion of the coin dispensing operation.

8. The coin dispensing machine of claim 7, wherein the respective elevators each include stop means arranged for interrupting the transverse motion of their respective shoes upon depletion of the coins from the respective channel and preventing the transverse movement of the coin engaging shoes of the remaining channels by said prime mover.

9. In a coin dispensing machine, a coin tray having a plurality of coin dispensing channels each respectively arranged to hold a stack of coins and each including a substantially coextensive longitudinal guide slot, a coin supporting elevator slidable in each of said channels and having a portion projecting through the guide slot of its channel, biasing means urging said elevator upwardly of its channel, a slotted finger plate for each channel and longitudinally spaced from the upper end of its respective channel and arranged to restrict upward movement of the stack of coins when supported by said elevator, a coin dispensing chute communicating with the space defined by each of said finger plates and the end of its channel, finger pads respectively slidable in the slot of each finger plate and including a shoe having a leading edge engageable with a selected number of the uppermost coins of the stack of coins residing in a channel, biasing means for normally urging each of said shoes towards disengagement with said coins; means for selectively moving each of said finger pads and its shoe in the respective slots for movement of the uppermost coin into the said coin chute and comprising a link member for each shoe terminating at one end in a hook-like projection, said projection being releasably engageable with said finger pad, means for normally urging the hook-like projection of said link member toward disengagement with the said pad, a slotted lever for each of said link members arranged to slidably receive and support said link member at its hook-like projection, a plurality of electroresponsive devices each arranged upon energization thereof to selectively rock a respective lever on its support in a direction towards engagement of the hook-like projection of a respective link with its finger pad, a prime mover in mechanical connection with the other end of each of said link members and arranged upon energization thereof to simultaneously slidably move the respective links controlled by selected electro-responsive devices in the slot of its lever upon engagement of said hook-like projection with said finger pad to thereby cause the leading edge of said shoe to contact the uppermost coin in its channel and slidably force the coin or coins from the respective stacks of coins and into said coin dispensing chute; and means for interrupting current flow to the respective electro-responsive devices and to said prime mover to permit the respective levers, link members and finger pads to each return to its normal operating position upon the completion of the coin dispensing operation.

10. In a coin dispensing machine, a removable coin tray disposed on an exterior face of the machine and having a coin supporting shelf, a coin dispensing channel rising upwardly from said shelf and arranged to hold a stack of coins, said channel provided with a longitudinal opening to the exterior of the machine and of the width adjacent an upper end of said tray sufficient to admit coins for loading of the channel, said coin supporting shelf being provided with an elevator aperture within said channel and said channel having a longitudinal guide slot to the rear thereof and which is a continuation of said aperture, and stop means for restricting upward movement of a stack of coins within said channel, a coin supporting elevator slidable in said channel and having a web portion projecting through said guide slot and terminating in coin supporting portion disposable within said channel, biasing means independently urging said elevator upwardly of said channel, means for releasing said biasing means for movement of said elevator through said aperture to rest below said coin supporting shelf whereby said coin tray may be removed from the machine and independently of said elevator, a coin dispensing chute, means for removing a selected number of the uppermost coins from a channel supported stack of coins and including a coin engaging shoe having a leading edge engageable with the uppermost selected number of coins of the stack of coins, means for moving said shoe transversely of the stack of coins and into engagement with the coins to be dispensed, and means for returning said shoe to its normal operating position out of engagement with said coins upon completion of the coin dispensing operation.

11. In a coin dispensing machine, a removable coin tray having a coin supporting shelf, a plurality of coin dispensing channels rising upwardly from said shelf and respectively arranged to hold a stack of coins, said coin supporting shelf being provided with an elevator aperture within each channel and each of said channels having a longitudinal guide slot at the rear thereof and which is a continuation of a respective aperture, and stop means for restricting upward movement of a stack of coins within each channel, coin supporting elevators slidable in said channels and having web portions projecting through said guide slots and terminating in coin supporting portions disposable within said channels, biasing means independently urging the elevators upwardly of their respective channels, and means for releasing said biasing means for movement of the elevators through said apertures to rest below said coin supporting shelf whereby said coin tray may be removed from the machine and independently of said elevators.

12. In a coin dispensing machine, a removable coin tray having a hollow base open to the interior of the machine with a top surface of said base defining a coin supporting shelf, a plurality of coin dispensing channels rising upwardly from said shelf and respectively arranged to hold a stack of coins, said coin supporting shelf being provided with an elevator aperture within each channel and each of said channels having a longitudinal guide slot at the rear thereof and which is a continuation of a respective aperture, and stop means for restricting upward movement of a stack of coins within each channel, coin supporting elevators slidable in said channels and having web portions projecting through said guide slots and terminating in coin supporting portions disposable within said channels, biasing means independently urging the elevators upwardly of their respective channels and comprising a rotatable shaft, means for rotating said shaft between a biasing position and a rest position, a plurality of pulleys rotatable relative to said shaft, a plurality of torsion springs fastened at one end thereof to a respective pulley and having its opposite end fastened to said shaft whereby said springs are tightened when said shaft is rotated to said biasing position and released when said shaft is in its rest position, and a plurality of belts having one end thereof fastened to a respective pulley and arranged for spiral winding thereon, the opposite end of each belt being fastened to a respective elevator, said elevators adapted for movement through said apertures into said hollow base when said shaft is in its rest position for removal of said coin tray from the machine and independently of said elevators.

References Cited in the file of this patent

UNITED STATES PATENTS

| | | |
|---|---|---|
| 628,688 | Brandt | July 11, 1899 |
| 750,718 | Spear | Jan. 26, 1904 |
| 836,818 | Muzzy | Nov. 27, 1906 |
| 1,128,889 | Maier | Feb. 16, 1915 |
| 1,155,359 | Lewis | Oct. 5, 1915 |
| 1,166,499 | Von Barth | Jan. 4, 1916 |
| 1,195,829 | McDermott | Aug. 22, 1916 |
| 1,356,379 | McDermott | Oct. 19, 1920 |
| 1,757,613 | Brandt | May 6, 1930 |
| 1,807,789 | Kuenstler | June 2, 1931 |
| 1,833,558 | Burdick | Nov. 24, 1931 |
| 1,917,091 | Brandt | July 4, 1933 |
| 2,112,511 | Williams | Mar. 29, 1938 |
| 2,125,059 | Bachardy | July 26, 1938 |
| 2,498,150 | Brahe | Feb. 21, 1950 |
| 2,638,396 | Gabrielsen | May 12, 1953 |
| 2,893,406 | Buchholz | July 7, 1959 |
| 2,910,991 | Quinn | Nov. 3, 1959 |

UNITED STATES PATENT OFFICE

CERTIFICATE OF CORRECTION

Patent No. 3,131,702 May 5, 1964

Arnold R. Buchholz et al.

It is hereby certified that error appears in the above numbered patent requiring correction and that the said Letters Patent should read as corrected below.

Column 2, line 49, for "line" read -- lines --; column 4, line 13, for "of", second occurrence, read -- for --; column 5, line 57, after "components" insert -- being --; line 65, for "keyboards" read -- keyboard --; column 6, Table I, above the right-hand column, the heading "Switches operated" should be inserted; line 58, for "normal" read -- normally --; line 62, after "its" insert -- second --; same column 6, line 72, for "S10¢" read -- S10¢A --; column 10, line 9, for "last" read -- least --; column 14, line 8, for "self-explanator" read -- self-explanatory --; line 18, for "he" read -- the --; column 16, line 39, for "finger", first occurrence, read -- flange --; column 19, line 3, after "channel" insert a comma.

Signed and sealed this 15th day of September 1964.

(SEAL)
Attest:

ERNEST W. SWIDER
Attesting Officer

EDWARD J. BRENNER
Commissioner of Patents